(12) United States Patent
Kang

(10) Patent No.: US 9,532,216 B2
(45) Date of Patent: Dec. 27, 2016

(54) METHOD OF AUTHENTICATING USER, SERVER AND MOBILE TERMINAL PERFORMING THE SAME

(71) Applicant: LG CNS CO., LTD., Seoul (KR)

(72) Inventor: Min Kang, Seoul (KR)

(73) Assignee: LG CNS CO., LTD., Seoul (KR)

( * ) Notice: Subject to any disclaimer, the term of this patent is extended or adjusted under 35 U.S.C. 154(b) by 43 days.

(21) Appl. No.: 13/855,204

(22) Filed: Apr. 2, 2013

(65) Prior Publication Data

US 2014/0215563 A1    Jul. 31, 2014

(30) Foreign Application Priority Data

Apr. 5, 2012    (KR) ........................ 10-2012-0035759

(51) Int. Cl.

| | |
|---|---|
| G06F 7/04 | (2006.01) |
| G06F 15/16 | (2006.01) |
| G06F 17/30 | (2006.01) |
| H04L 29/06 | (2006.01) |
| H04W 12/06 | (2009.01) |

(Continued)

(52) U.S. Cl.
CPC .............. H04W 12/06 (2013.01); G06F 21/35 (2013.01); H04L 63/107 (2013.01); H04L 63/18 (2013.01); H04W 4/02 (2013.01); G06F 2221/2111 (2013.01); H04L 63/0853 (2013.01);

(Continued)

(58) Field of Classification Search
CPC ..... G06Q 20/3224; H04W 12/06; H04W 4/02; H04W 4/021; H04W 12/12; H04W 48/04; G06F 21/35; G06F 2221/2111; H04L 63/107; H04L 63/18; H04L 63/0853

See application file for complete search history.

(56) References Cited

U.S. PATENT DOCUMENTS

| | | | |
|---|---|---|---|
| 8,578,454 B2 * | 11/2013 | Grim | ................................ 726/4 |
| 2006/0089160 A1 * | 4/2006 | Othmer | ............ H04M 1/72572 |
| | | | 455/457 |

(Continued)

FOREIGN PATENT DOCUMENTS

| | | |
|---|---|---|
| KR | 1020090036813 A | 4/2009 |
| KR | 1010011970000 | 12/2010 |
| KR | 1020110049196 | 5/2011 |

OTHER PUBLICATIONS

Grim, U.S. Appl. No. 61/551,370, filed Oct. 25, 2011, p. 1-7.*

*Primary Examiner* — Linglan Edwards
*Assistant Examiner* — Forrest Carey
(74) *Attorney, Agent, or Firm* — Maxine L. Barasch; Keohane & D'Alessandro PLLC

(57) ABSTRACT

A user authenticating method is performed by a user authenticating server connectable to at least one mobile terminal and a user terminal. The user authenticating method includes: receiving access information of a network including an access identification code and an access location code from the user terminal; estimating an access location of a network based on the access location code; determining at least one mobile terminal associated with the access identification code; transmitting the estimated access location of a network to the at least one mobile terminal; and receiving a location-based access approval or access rejection determined based on the access location of a network and a location of a particular mobile terminal belonging to the at least one mobile terminal from the particular mobile terminal.

32 Claims, 8 Drawing Sheets

(51) Int. Cl.
  *G06F 21/35* (2013.01)
  *H04W 4/02* (2009.01)
  H04W 48/04 (2009.01)
  H04W 12/12 (2009.01)

(52) U.S. Cl.
  CPC ............ *H04W 4/021* (2013.01); *H04W 12/12* (2013.01); *H04W 48/04* (2013.01)

(56) References Cited

U.S. PATENT DOCUMENTS

| | | | |
|---|---|---|---|
| 2008/0227471 A1* | 9/2008 | Dankar et al. | 455/456.6 |
| 2009/0157547 A1* | 6/2009 | Ruckart | 705/44 |
| 2009/0327134 A1* | 12/2009 | Carlson et al. | 705/44 |
| 2011/0164058 A1* | 7/2011 | Lemay | G06F 3/0488 345/651 |
| 2011/0286437 A1* | 11/2011 | Austin | H04W 4/02 370/338 |
| 2012/0290481 A1* | 11/2012 | Finkenzeller et al. | 705/44 |
| 2013/0217427 A1* | 8/2013 | Bajko | H04W 48/14 455/507 |

* cited by examiner ered based on the access location of a network and a location of a particular mobile terminal belonging to the at least one mobile terminal from the particular mobile terminal.
METHOD OF AUTHENTICATING USER, SERVER AND MOBILE TERMINAL PERFORMING THE SAME

CROSS-REFERENCE TO RELATED APPLICATION

This application claims priority under 35 U.S.C. §119 to Korean Patent Application No. 10-2012-0035759, filed on Apr. 5, 2012, in the Korean Intellectual Property Office, the contents of which is incorporated herein by reference.

BACKGROUND OF THE INVENTION

Field of the Invention

The present invention relates to a user authenticating technique and, more particularly, to a user authenticating method which is simple and capable of strengthening security, and a user authenticating server and a mobile terminal performing the same.

Related Art

When a user accesses a network service, user authentication is performed to verify that the user is a corresponding service subscriber to be entitled to the use of the network service, and here, user authentication may be performed as the user inputs an ID or a password or logs in through a certificate.

In this case, however, any one, although he is not a service subscriber, may access a network service by simply inputting personal information. So when personal information of a user is leaked due to hacking, or the like, damage to the user may not be prevented if someone else intentionally accesses the network service with the user's personal information. Prior art patent documents mentioned above provide various techniques for preventing such damage.

Korean Patent Laid Open Publication No. 10-2011-0049196 relates to a technique for preventing hacking by allowing a user to input personal information through an action guard flash.

Korean Patent Laid Open Publication No. 10-2009-0036813 relates to a technique for preventing hacking of input data of a virtual keyboard by using mouse input coordinate values.

The prior art solves the problem of security of a network access by providing an action guard flash or mouse input coordinates values, but such solutions have a limitation in fundamentally preventing damage due to hacking, or the like, in accessing a service network.

SUMMARY OF THE INVENTION

It is, therefore, an object of the present invention to provide a user authenticating method capable of strengthening security to simply prevent damage to a user when user's personal information such as a password, a certificate, or the like, is leaked, and a user authenticating server and a mobile terminal performing the same.

Another object of the present invention is to provide a user authenticating method capable of providing a difference in physical distance between a network access location and a user, as a security factor, when a network is accessed in a situation in which user's personal information is leaked due to hacking, or the like, and a user authenticating method and a mobile terminal performing the same.

To achieve the above objects, there is provided a user authenticating method performed by a user authenticating server connectable to at least one mobile terminal and a user terminal. The user authenticating method includes: receiving access information of a network including an access identification code and an access location code from the user terminal; estimating an access location of a network based on the access location code; determining at least one mobile terminal associated with the access identification code; transmitting the estimated access location of a network to the at least one mobile terminal; and receiving a location-based access approval or access rejection determined based on the access location of a network and a location of a particular mobile terminal belonging to the at least one mobile terminal from the particular mobile terminal.

The receiving of the location-based access approval or access rejection may include: when the estimated access location of a network and the location of the particular mobile terminal fall within a particular error range, receiving the location-based access approval automatically determined by the mobile terminal or determined by a user approval; and when the estimated access location of a network and the location of the particular mobile terminal do not fall within the particular error range, receiving the location-based access rejection automatically determined by the mobile terminal.

The receiving of the location-based access approval or access rejection may further include: when the location-based access rejection is automatically received by the mobile terminal because the estimated access location and the location of the particular mobile terminal do not fall within the particular error range, requesting an access approval from a user associated with the network service.

The receiving of the location-based access approval or access rejection may include: when the location-based access approval is received from the particular mobile terminal, disregarding location-based access approvals or access rejections from the other remaining mobile terminals.

The user authenticating method may further include: when the location-based access approval or access rejection is finally determined, notifying at least some of the at least one mobile terminal about the determination.

The user authenticating server may correspond to an Internet portal server, an Internet shopping mall server, an Internet service server, a cloud computing server, a main service server, or a banking service server.

The access location code may correspond to a network address. The estimating of the access location of a network may further include: converting the network address into location information already used by the at least one mobile terminal. The already used location information may include location data converted by a global positioning system (GPS), a WiFi-based positioning system (WPS), or a cellular-based positioning system (CPS).

To achieve the above objects, there is also provided a user authenticating method performed by a mobile terminal connectable to a user authenticating server. The user authenticating method includes: receiving an access location of a network and an access approval request from the user authenticating server; estimating a location of the mobile terminal; and approving or rejecting the access approval request based on location information regarding the access location of a network and the estimated location of the mobile terminal. The user authenticating server may correspond to an Internet portal server, an Internet shopping mall server, an Internet service server, a cloud computing server, a main service server, or a banking service server.

The approving or rejecting the access approval request may include: automatically approving the access approval request when the access location of a network and the estimated location of the mobile terminal fall within a particular error range.

The approving or rejecting the access approval request may further include: displaying the access location of a network and the estimated location of the mobile terminal on a map. The approving or rejecting the access approval request may further include: prompting an access approval request from a user on the displayed map.

The approving or rejecting the access approval request may further include: prompting the access approval, determined based on a distance between the access location of a network and the estimated location of the mobile terminal, from the user.

The estimating of the location of the mobile terminal may include at least one of global positioning system (GPS)-based location information, WiFi-based positioning system (WPS)-based location information, and cellular-based positioning system (CPS)-based location information.

To achieve the above objects, there is also provided a user authenticating server connectable to at least one mobile terminal and a user terminal. The user authenticating server includes: an access information receiving unit configured to receive access information including an access identification code and an access location code from the user terminal; an access location estimating unit configured to estimate an access location of a network based on the access location code; an access information transmitting unit configured to determine at least one mobile terminal associated with the access identification code, and transmit the estimated access location of a network to the at least one mobile terminal; and an access permission receiving unit configured to receive a location-based access approval or access rejection determined based on the estimated access location of a network and a location of a particular mobile terminal belonging to the at least one mobile terminal from the particular mobile terminal.

When the estimated access location of a network and the location of the particular mobile terminal fall within a particular error range, the access permission receiving unit may receive the location-based access approval automatically determined by the mobile terminal or determined under a user approval, and when the estimated access location of a network and the location of the particular mobile terminal do not fall within the particular error range, the access permission receiving unit may receive the location-based access rejection automatically determined by the mobile terminal.

When the location-based access rejection is automatically received by the mobile terminal because the estimated access location of a network and the location of the particular mobile terminal do not fall within the particular error range, the access permission receiving unit may request an access approval from a user associated with the network service.

When the location-based access approval is received from the particular mobile terminal, the access permission receiving unit may disregard location-based access approvals or access rejections by the other remaining mobile terminals. The user authenticating server may further include: an access notifying unit configured to notify at least some of the at least one mobile terminal about content of determination, when the location-based access approval or access rejection is finally determined.

The user authenticating server may correspond to an Internet portal server, an Internet shopping mall server, an Internet service server, a cloud computing server, a main service server, or a banking service server.

The access location code may correspond to a network address. The access location estimating unit may convert the network address into location information already used by the at least one mobile terminal. The already used location information may include location data converted by a global positioning system (GPS), a WiFi-based positioning system (WPS), or a cellular-based positioning system (CPS).

To achieve the above objects, there is also provided a mobile terminal connectable to the user authenticating server and performing network service accessing. The mobile terminal includes: an access approval request receiving unit configured to receive an access location of a network and an access approval request from the user authenticating server; a location estimating unit configured to estimate a location of the mobile terminal; and an access approving unit configured to approve or reject the access approval request based on location information regarding the access location of a network and the estimated location of the mobile terminal. The user authenticating server may correspond to an Internet portal server, an Internet shopping mall server, an Internet service server, a cloud computing server, a main service server, or a banking service server.

When the access location of a network and the estimated location of the mobile terminal fall within a particular error range, the access approving unit may automatically approve the access approval request.

The access approving unit may display the access location of a network and the estimated location of the mobile terminal on a map. The access approving unit may prompt an access approval request, determined based on a distance between the access location of a network and the estimated location of the mobile terminal, from a user.

The location estimating unit may determine the location of the mobile terminal based on at least one of global positioning system (GPS)-based location information, WiFi-based positioning system (WPS)-based location information, and cellular-based positioning system (CPS)-based location information.

In the case of the user authenticating and accessing method and relevant techniques according to embodiments of the present invention, when a network service is accessed, security can be strengthened in a situation in which personal information is leaked due to hacking, or the like, by using a physical distance difference between a network access location and a user.

In the case of the user authenticating and accessing method and relevant techniques according to embodiments of the present invention, when a network service is accessed, leakage of user's personal information is prevented by using a physical distance difference between a network access location and a user. This is because network accessing may be permitted under a user's explicit or implicit approval.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Figure 1:
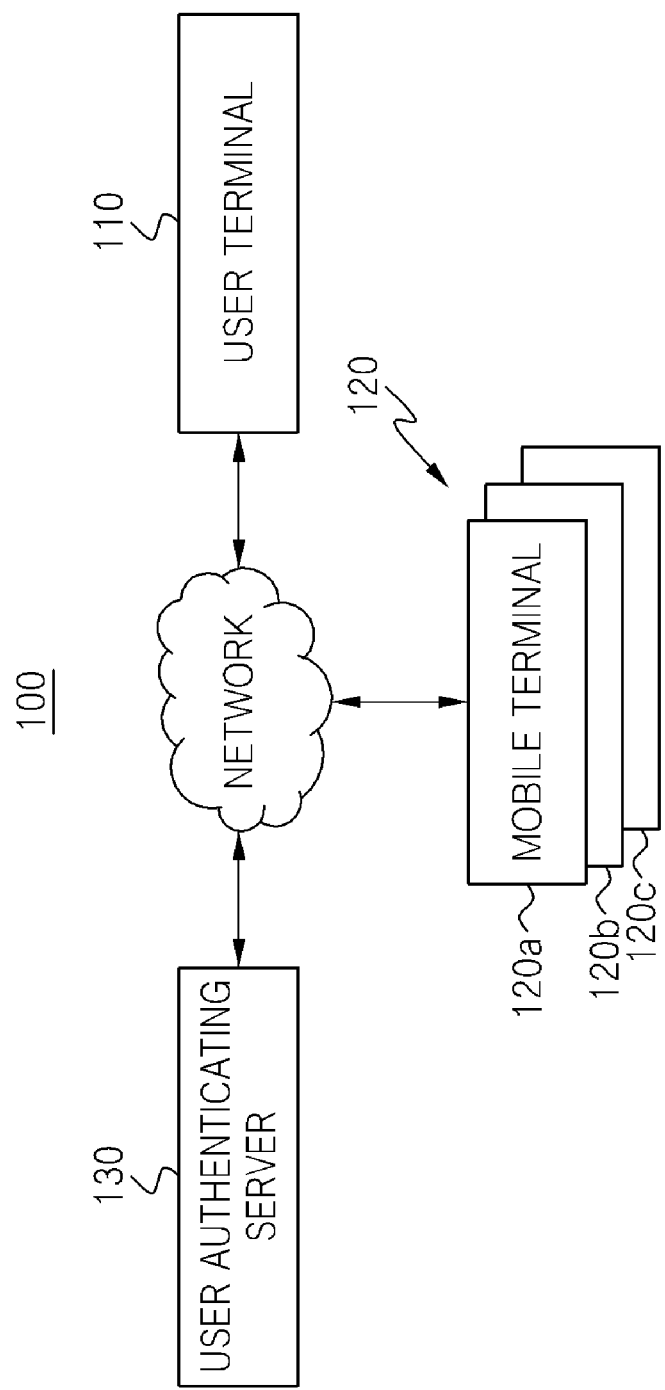
FIG. 1 is a view illustrating a user authenticating system according to an embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~between", "immediately~between" or "adjacent to~" and "directly adjacent to~" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms.

In the embodiments of the present invention, the foregoing method may be implemented as codes that can be read by a processor in a program-recorded medium. The processor-readable medium may include any types of recording devices in which data that can be read by a computer system is stored. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). The computer-readable recording medium may be distributed over network-coupled computer systems so that the computer-readable code may be stored and executed in a distributed fashion.

In the foregoing exemplary system, the methods are described based on the flow chart as sequential steps or blocks, but the present invention is not limited to the order of the steps and some of them may be performed in order different from the order of the foregoing steps or simultaneously. Also, a skilled person in the art will understand that the steps are not exclusive but may include other steps, or one or more steps of the flow chart may be deleted without affecting the scope of the present invention.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a view illustrating a user authenticating system according to an embodiment of the present invention.

Referring to FIG. 1, a user authenticating system 100 may include a user authenticating server 110, a mobile terminal 120, and a user terminal 130.

The user authenticating server 110, a computing device for processing user authentication, may be managed by, for example, an Internet portal site, an Internet shopping mall, an Internet service enterprise, a cloud computing service enterprise, an Internet main service enterprise, an Internet banking service enterprise, or the like. When a user inputs network service access information through a network, the user authenticating server 110 may receive network access information. The network access information may include an access time, a user ID, a password, certificate information, and an access network address. Here, the access identification code may correspond to an ID, a password, or certificate information, and the access location code may correspond to a network address.

The mobile terminal 120, a computing device carried around by a network service accessing user, may include, for example, a user terminal capable of estimating a location of its own, like a smart phone or a tablet PC. When accessing a network service is attempted, the mobile terminal may receive an access location of a network, and may approve or reject the access based on the access location of a network.

The user terminal 130 may be a user terminal for accessing a network service, and a location of the user terminal 130 may be estimated by the user authenticating server 110. In an embodiment, the user terminal 130 may be a computing device such as a smart phone, a tablet PC, a desktop computer, or a notebook computer, and a location thereof may be estimated through a network address.

Figure 2:
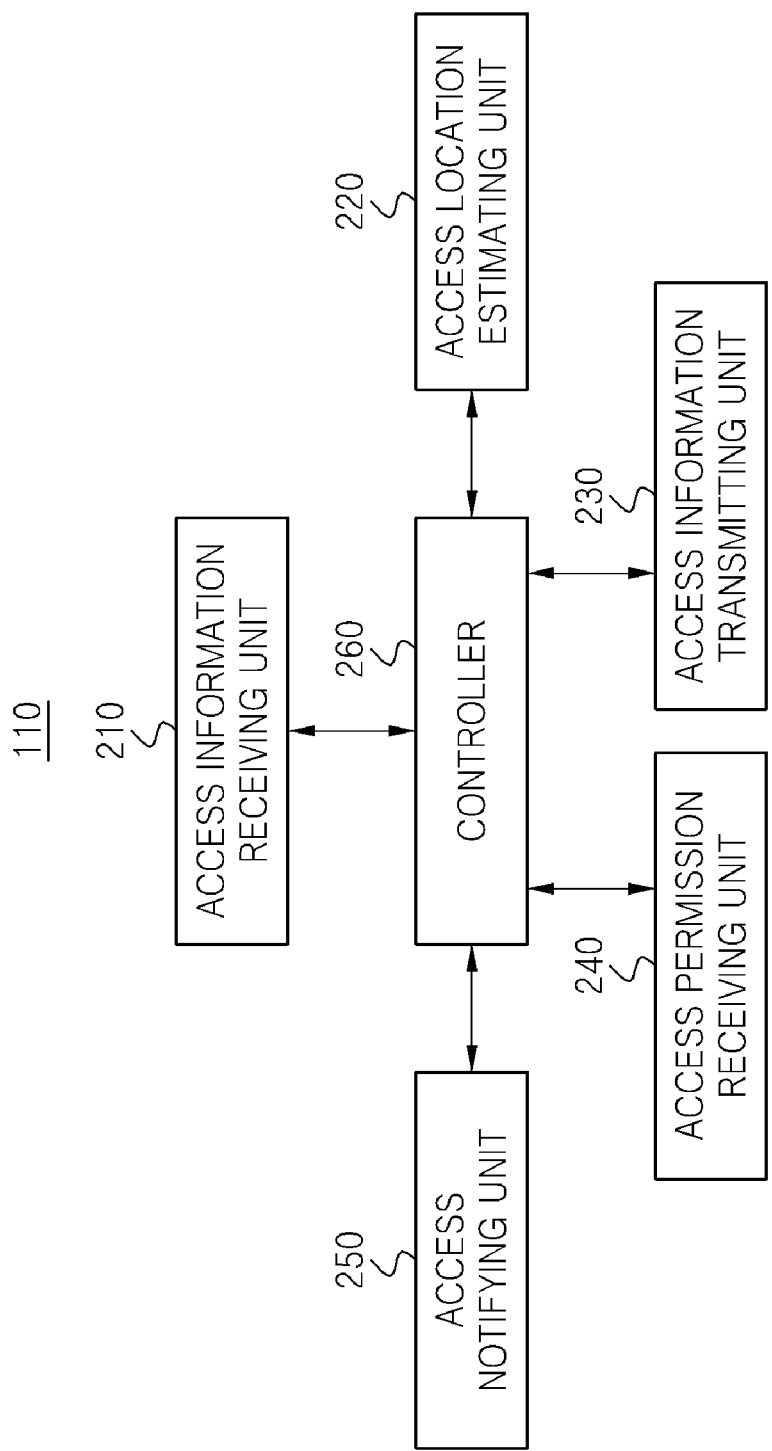
FIG. 2 is a block diagram of a user authenticating server of FIG. 1.

FIG. 2 is a block diagram of the user authenticating server of FIG. 1.

Referring to FIG. 2, the user authenticating server 110 may include an access information receiving unit 210, an access location estimating unit 220, an access information transmitting unit 230, an access permission receiving unit 240, an access notifying unit 250, and a controller 260.

The access information receiving unit 210 may receive network access information including an access identification code and an access location code from the user terminal 130. The access identification code may correspond to information regarding an ID, a password, and a certificate, and the access location code may correspond to a network address (e.g., an Internet address).

The access location estimating unit 220 may estimate an access location of a network based on the access location code. In an embodiment, the access location estimating unit 220 may convert the access location of a network into location information already used by the mobile terminal 120. For example, the location information may include location data converted by a global positioning system (GPS), a WiFi-based positioning system (WPS), or a cellular-based positioning system (CPS). As a result, the access location estimating unit 220 may convert the access location code into position information already used by the mobile terminal 120.

Hereinafter, a process of generating location information based on the access location code by the access location estimating unit 220 will be described.

The access location estimating unit 220 may receive a network address as an access location code and obtain access location data (e.g., an address of an administrative district) corresponding to the network address. During this process, the access location estimating unit 220 may retrieve the access location data from an external network enterprise (or an external network provider). The access location estimating unit 220 may convert the access location data into location data (e.g., a latitude and a longitude) by using a GPS, a WPS, and a CPS.

The access information transmitting unit 230 may determine at least one mobile terminal 120 associated with the access identification code. Here, a correspondence relationship between the access identification code and the at least one mobile terminal 120 may correspond to 1:n (n is a natural number). In an embodiment, the access information transmitting unit 230 may interwork with a database (not shown) defining a relationship between the access identification code and the corresponding mobile terminal, and when the access identification code is received, the access information transmitting unit 230 may search the database for the corresponding mobile terminal. Here, the at least one mobile terminal 120 may include a smartphone or a tablet PC owned by a network service subscriber, or may further include a mobile terminal of a different user the network service subscriber has registered previously.

The access information transmitting unit 230 may transmit the access location estimated by the access location estimating unit 220 and an access approval request to the at least one mobile terminal 120. In an embodiment, the access location of a network may be location information converted by the access location estimating unit 220. For example, the location information may include location data converted by a GPS, a WPS, and a CPS.

The access permission receiving unit 240 may receive a location-based access approval or access rejection from a particular mobile terminal 120a belonging to the at least one mobile terminal 120. The location-based access approval or rejection may be determined based on the access location of a network and the location of the particular mobile terminal 120a. Such a determination will be described in detail with reference to FIG. 3. In an embodiment, when the location-based access approval is received from the particular mobile terminal 120a, the access permission receiving unit 240 may disregard a location-based access approval or access rejection by the other remaining mobile terminals 120b and 120c. Here, the user authenticating server 110 may finally determine the location-based access approval received from the particular mobile terminal 120a and perform an access approval or access rejection.

When the location-based access approval or access rejection is finally determined, the access notifying unit 250 may notify at least some of the at least one mobile terminal 120 about content of the final determination. In an embodiment, when the access approval is received, the at least some of the at least one mobile terminal may correspond to the mobile terminal (e.g., 120a) which has transmitted the access approval, and when the access rejection is received, the at least some of the at least one mobile terminal may correspond to all the mobile terminals 120a to 120c. In a different embodiment, at least some of the at least one mobile terminal may correspond to all the mobile terminals 120a to 120c regardless of the access. Selection of the embodiments may be determined according to a user setting.

The controller 260 may control an overall operation of the user authenticating server 110, and control a control flow or a data flow between or among the access information receiving unit 210, the access location estimating unit 220, the access information transmitting unit 230, the access permission receiving unit 240, and the access notifying unit 250.

Figure 3:
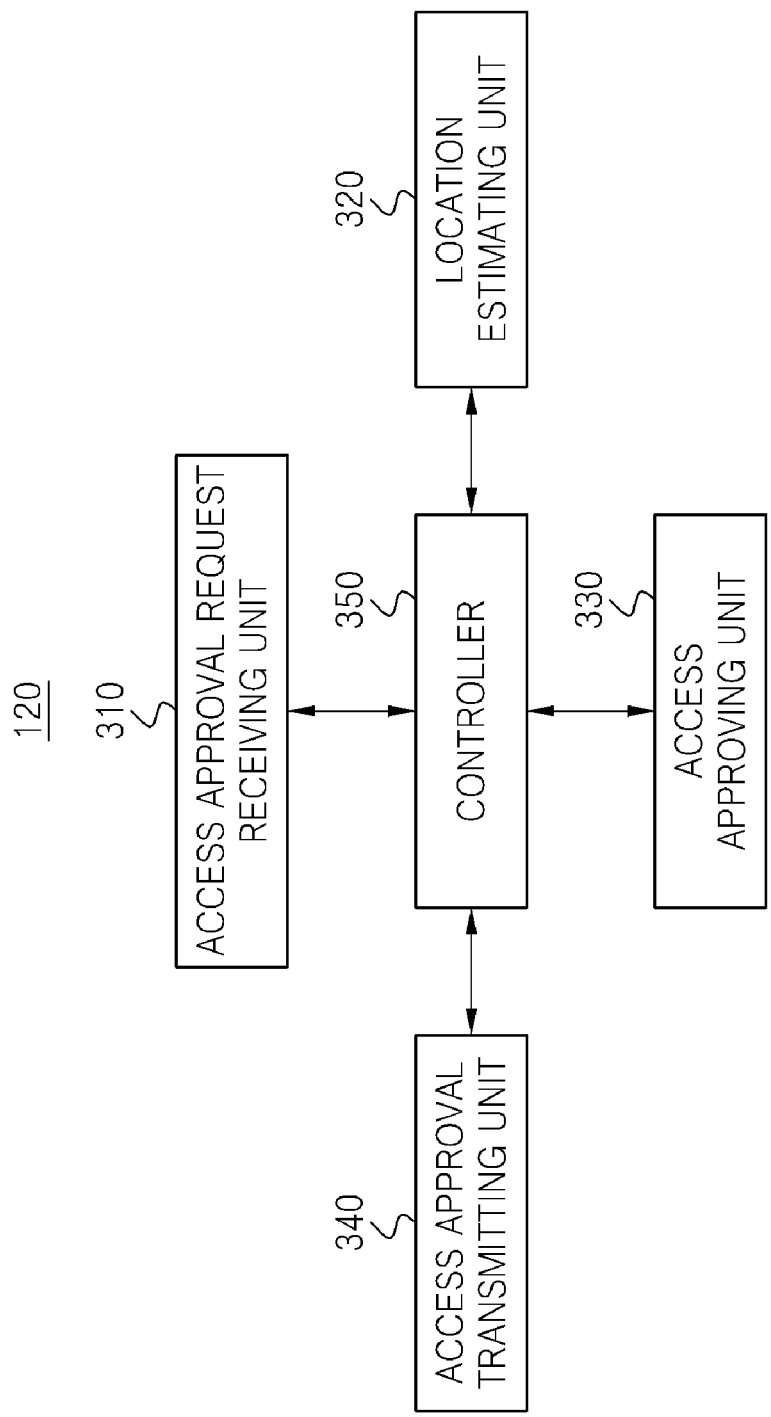
FIG. 3 is a block diagram of a mobile terminal of FIG. 1.

FIG. 3 is a block diagram of the mobile terminal of FIG. 1.

Referring to FIG. 3, the mobile terminal 120 may include an access approval request receiving unit 310, a location estimating unit 320, an access approving unit 330, an access approval transmitting unit 340, and a controller 350.

The access approval request receiving unit 310 may receive the access location of a network and the access approval request from the access information transmitting unit 230. In an embodiment, the access approval request receiving unit 310 may receive an estimated access location of a network from the access information transmitting unit 230. Here, the access location of a network may include location data converted by a GPS, a WPS, or a CPS.

The location estimating unit 320 may estimate a location of the mobile terminal 120. Here, the location estimating unit 320 may determine a location of the mobile terminal 120 based on at least one of a GPS scheme, a WPS scheme, and a CPS scheme. In an embodiment, in the case of the GPS, the location estimating unit 320 may determine a location of the mobile terminal 120 upon receiving GPS signals from a plurality of satellites. In a different embodiment, in the case of the WPS, the location estimating unit 320 may determine a location of the mobile terminal 120 by using information regarding a wireless access point (AP) transferred through Wi-Fi. In a different embodiment, in the case of the CPS, the location estimating unit 320 may determine a location of the mobile terminal 120 upon receiving a signal from the mobile terminal 120 transferred to a base station (BS) of a mobile carrier. In these embodiments, the location of the mobile terminal 120 may be converted into location data (e.g., a latitude and a longitude).

The access approving unit 330 may approve or reject the access approval request based on location information regarding the access location of a network and the location of the mobile terminal 120. The access approving unit 330 may approve or reject the access approval request upon comparing the location of the mobile terminal 120 estimated by the location estimating unit 320 and the access location of a network. Hereinafter, a process of comparing locations by the access approving unit 330 will be described.

The access approving unit 330 may determine whether the access location of a network and the location of the mobile terminal 120 fall within a particular error range. The error range may be a distance difference between the access location of a network and the location of the mobile terminal 120. For example, the error range may correspond to the shortest linear distance difference between the access location of a network and the location of the mobile terminal 120. In an embodiment, the particular error range may be set by the mobile terminal 120, and may correspond to an error range estimated by a GPS, a WPS, or a CPS. In a different embodiment, the particular error range may be set by a user, and such a set value may be greater than an error range estimated by a GPS, a WPS, or a CPS.

When the access location of a network and the location of the mobile terminal 120 fall within the particular error range, the access approving unit 330 may approve the access approval request. Such an approval determination may be automatically performed by the mobile terminal 120 or may be performed under a user approval. For example, when a distance difference between the access location of a network and the mobile terminal 120 falls within a particular range, the access approving unit 330 may approve the access approval request.

When the access location of a network and the location of the mobile terminal 120 do not fall within the particular error range, the access approving unit 330 may automatically reject the access approval request in the mobile terminal 120. For example, when the access location of a network and the location of the mobile terminal 120 exceed the particular error range, the mobile terminal 120 may automatically reject the access approval request. Such a rejection is to prevent a loss made as someone else accesses a network service when personal information is leaked due to hacking, or the like.

When the access approval request is automatically rejected by the access approving unit 330 of the mobile terminal 120 because the access location of a network and the location of the mobile terminal 120 do not fall within the particular error range, the access permission receiving unit 240 of the user authenticating server 110 may request an access approval from a user associated with the network service. Namely, although the network access location and the location of the mobile terminal 120 exceed the particular error range, the access approving unit 330 may request an access approval from the mobile terminal 120. This is because the network service subscriber may allow someone else in a remote area to access the network service access.

Figure 7:
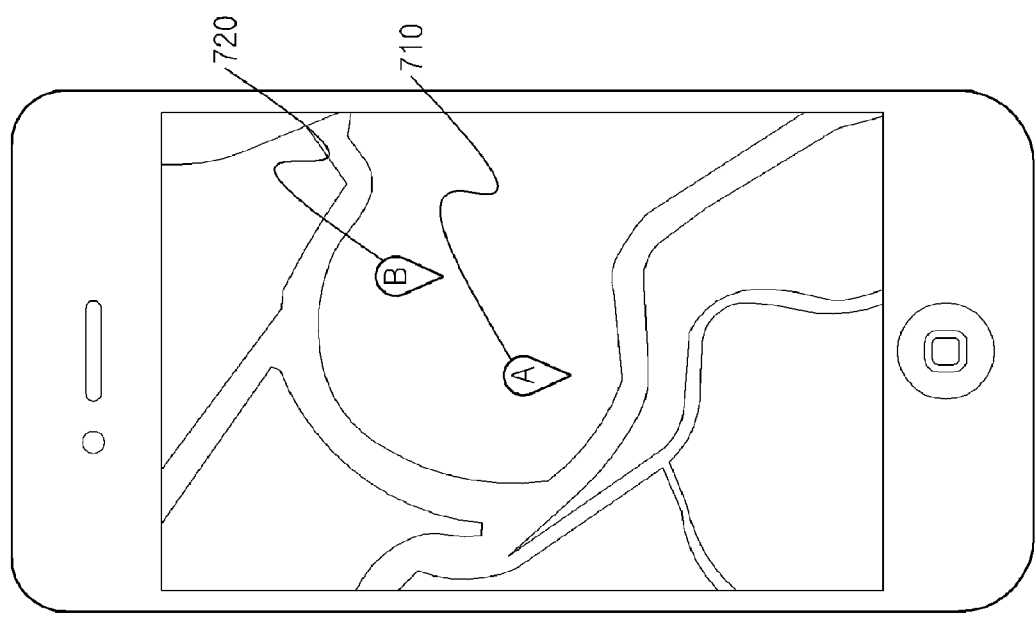
FIG. 7 is a view illustrating a mobile terminal displaying a map in which a location in which a network is accessed and a location of the mobile terminal are indicated.
Figure 8:
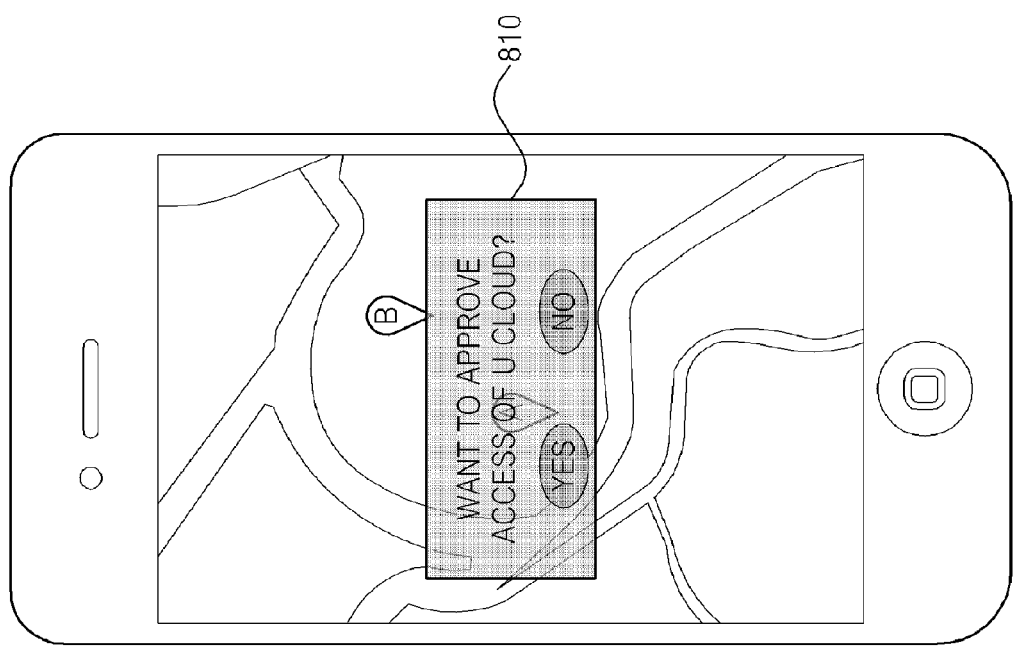
FIG. 8 is a view illustrating a mobile terminal displaying an access approval request through a pop-up window overlaid on a map.

FIGS. 7 and 8 are views illustrating the mobile terminal 120 displaying a network access location and a location of the mobile terminal on a map.

In FIG. 7, the access approving unit 330 may display an access location 710 of a network and a location 720 of the mobile terminal 120 on a map. Here, the display on the map may be performed through an application programming interface (API) provided by a map service enterprise. In detail, the access approving unit 330 may display the access location of a network and the location of the mobile terminal 120, respectively, on the map, and determine the scale of the map based on the locations.

In FIG. 8, the access approving unit 330 may prompt an access approval request on the map from the user of the mobile terminal 120. In detail, the access approving unit 330 may display the access location of a network and the location of the mobile terminal 120 on the map and guide the user to approve the access request. Such guidance may be made through a pop-up window 810 transparently overlaid on the map, and the user of the mobile terminal 120 may approve or reject the access approval request through the pop-up window 810 overlaid on the map.

Back in FIG. 3, unlike the cases of FIGS. 7 and 8, the access approving unit 330 may prompt the access approval request from the user with a location between the access location of a network and the location of the mobile terminal 120. In detail, the access approving unit 330 may inform the user about a distance difference between the access location of a network and the location of the mobile terminal 120 to guide the user about the access approval request. Such guidance may be made through a pop-up window, and the user of the mobile terminal 120 may selectively approve or reject the access approval request through the pop-up window.

The access approval transmitting unit 340 may transmit the approval or rejection determined by the access approving unit 330 to the access permission receiving unit 240.

The controller 350 may control an overall operation of the mobile terminal 120, and the mobile terminal may control a control flow or a data flow between or among the access approval request receiving unit 310, the location estimating unit 320, the access approving unit 330, and the access approval transmitting unit 340.

Figure 4:
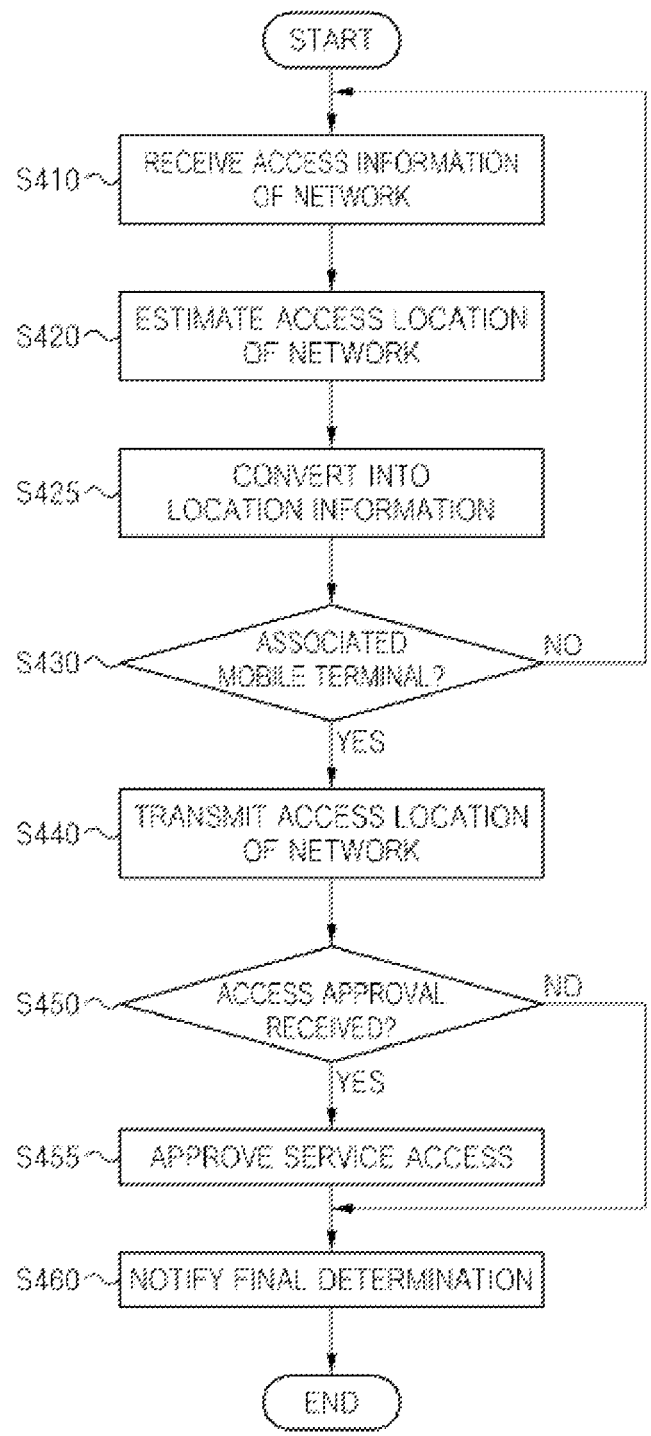
FIG. 4 is a flow chart illustrating a user authenticating process performed by the user authenticating server.

FIG. 4 is a flow chart illustrating a user authenticating process performed by the user authenticating server.

When the user inputs network service access information through a network, the access information receiving unit 210 receives access information of a network from the user terminal 130 (step S410). Here, the access information of a network may include an access identification code and an access location code. In an embodiment, the access location code may correspond to a network address.

The access location estimating unit 220 estimates an access location of a network based on an access location code (step S420). In an embodiment, the access location of a network may be estimated through a network address. The access location estimating unit 220 may convert the access location into location information (e.g., a latitude and a longitude) already used in the mobile terminal 120 (step S425). Here, the location information already used by the mobile terminal 120 may include location data converted by a GPS, a WPS, or a CPS.

In steps S420 and S425, the access location estimating unit 220 receives the network access as an access location code and obtains access location data corresponding to a network address (e.g., an address of an administrative district) corresponding to a network address. During this process, the access location estimating unit 220 may retrieve access location data from an external network enterprise. The access location estimating unit 220 may convert the access location data into location data (e.g., a latitude and a longitude) by a GPS, a WPS, or a CPS.

The access information transmitting unit 230 may determine at least one mobile terminal 120 associated with the access identification code (step S430). In step S430, a correspondence relationship between the access identification code and the at least one mobile terminal 120 may correspond to 1:n (n is a natural number). In an embodiment, the access information transmitting unit 230 may interwork with a database (not shown) defining a relationship between the access identification code and the corresponding mobile terminal, and when the access identification code is received, the access information transmitting unit 230 may search the database for the corresponding mobile terminal.

The access information transmitting unit 230 transmits the estimated access location to at least one mobile terminal 120 (step S440). In step S440, the access information transmitting unit 230 may transmit the estimated access location of a network and an access approval request to the at least one mobile terminal 120. In an embodiment, the access location of a network may be location information converted by the access location estimating unit 220. For example, the location information may include location data converted by a GPS, a WPS, and a CPS.

The access permission receiving unit 240 receives a location-based access approval or access rejection determined based on the estimated access location of a network and the location of a mobile terminal 120a belonging to the at least one mobile terminal 120 from the particular mobile terminal 120a (step S450). In step S450, the location-based access approval or rejection may be determined based on the access location of a network and the location of the particular mobile terminal 120a. Such a determination will be described in detail with reference to FIG. 5. In an embodiment, when the location-based access approval is received from the particular mobile terminal 120a, the access permission receiving unit 240 may disregard a location-based access approval or access rejection by the other remaining mobile terminals 120b and 120c. When the access approval or the access rejection is finally determined, the access permission receiving unit 240 may notify the at least one mobile terminal 120 about final determination content (step S460).

Figure 5:
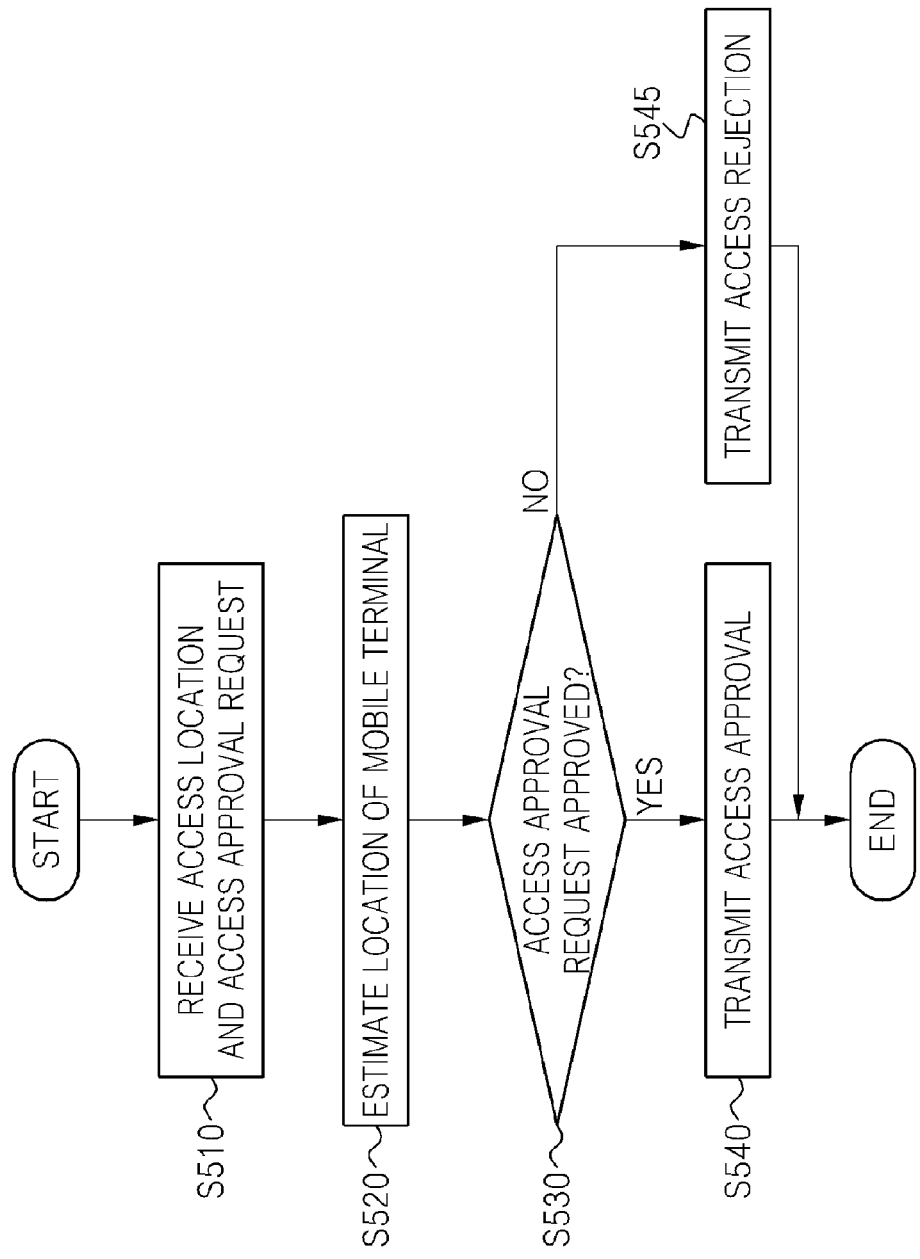
FIG. 5 is a flow chart illustrating a user authenticating process performed by the mobile terminal.

FIG. 5 is a flow chart illustrating a user authenticating process performed by the mobile terminal.

The access approval request receiving unit 310 receives an access location of a network and an access approval request from the access information transmitting unit 230 (step S510). In an embodiment, the access location of a network may include location data converted by a GPS, a WPS, or a CPS.

The location estimating unit 320 may estimate a location of the mobile terminal 120 (step S520). In step S520, the location estimating unit 320 may determine a location of the mobile terminal 120 based on at least one of a GPS, a WPS, and a CPS. In an embodiment, in the case of the GPS, the location estimating unit 320 may determine a location of the mobile terminal 120 upon receiving GPS signals from a plurality of satellites. In a different embodiment, in the case of the WPS, the location estimating unit 320 may determine a location of the mobile terminal 120 by using information regarding a wireless access point (AP) transferred through Wi-Fi. In a different embodiment, in the case of the CPS, the location estimating unit 320 may determine a location of the mobile terminal 120 upon receiving a signal from the mobile terminal 120 transferred from a base station (BS) of a mobile carrier. In these embodiments, the location of the mobile terminal 120 may be converted into location data (e.g., a latitude and a longitude).

The access approving unit 330 may approve or reject the access approval request based on location information regarding the access location of a network and the location of the mobile terminal 120 (step S530).

In step S530, the access approving unit 330 may determine whether the access location of a network and the location of the mobile terminal 120 fall within a particular error range. In an embodiment, the particular error range may be set by the mobile terminal 120, or may be set by a user. The value set by the user may be greater than an error range estimated by a GPS, a WPS, or a CPS.

When the access location of a network and the location of the mobile terminal 120 fall within the particular error range in step S530, the access approving unit 330 may approve the access approval request. Such an approval determination may be automatically performed by the mobile terminal 120 or may be performed under a user approval. For example, when a distance difference between the access location of a network and the mobile terminal 120 falls within a particular range, the access approving unit 330 may approve the access approval request.

When the access location of a network and the location of the mobile terminal 120 do not fall within the particular error range, the access approval request may be automatically rejected by the mobile terminal 120. For example, when the access location of a network and the location of the mobile terminal 120 exceed the particular error range, the mobile terminal 120 may automatically reject the access approval request.

When the access approval request is automatically rejected because the access location of a network and the location of the mobile terminal 120 do not fall within the particular error range, the access permission receiving unit 240 of the user authenticating server 110 may request an access approval from a user associated with a network service. Namely, although the access location of a network and the location of the mobile terminal 120 exceed the particular error range, the access approving unit 330 may request an access approval from the mobile terminal 120.

In step S530, the access approving unit 330 may display the access location of a network and the location of the mobile terminal 120 on a map. In an embodiment, the access approving unit 330 may display the access location of a network and the location of the mobile terminal 120, respectively, on the map, and determine the scale of the map based on the locations.

In step S530, the access approving unit 330 may prompt an access approval request on the map from the user of the mobile terminal 120. In detail, the access approving unit 330 may display the access location of a network and the location of the mobile terminal 120 on the map and guide the user to approve the access request. In an embodiment, such guidance may be made through a pop-up window transparently overlaid on the map, and the user of the mobile terminal 120 may approve or reject the access approval request through the pop-up window overlaid on the map.

In step S530, the access approving unit 330 may prompt the access approval request from the user with the access location of a network and the location of the mobile terminal 120. In detail, the access approving unit 330 may inform the user about a distance difference between the access location of a network and the location of the mobile terminal 120 to guide the user about the access approval request. In an embodiment, such guidance may be made through a pop-up window, and the user of the mobile terminal 120 may selectively approve or reject the access approval request through the pop-up window.

The access approval transmitting unit 340 transmits the approval or rejection determined by the access approving unit 330 to the access permission receiving unit 240 (step S540 or step S545)

Figure 6:
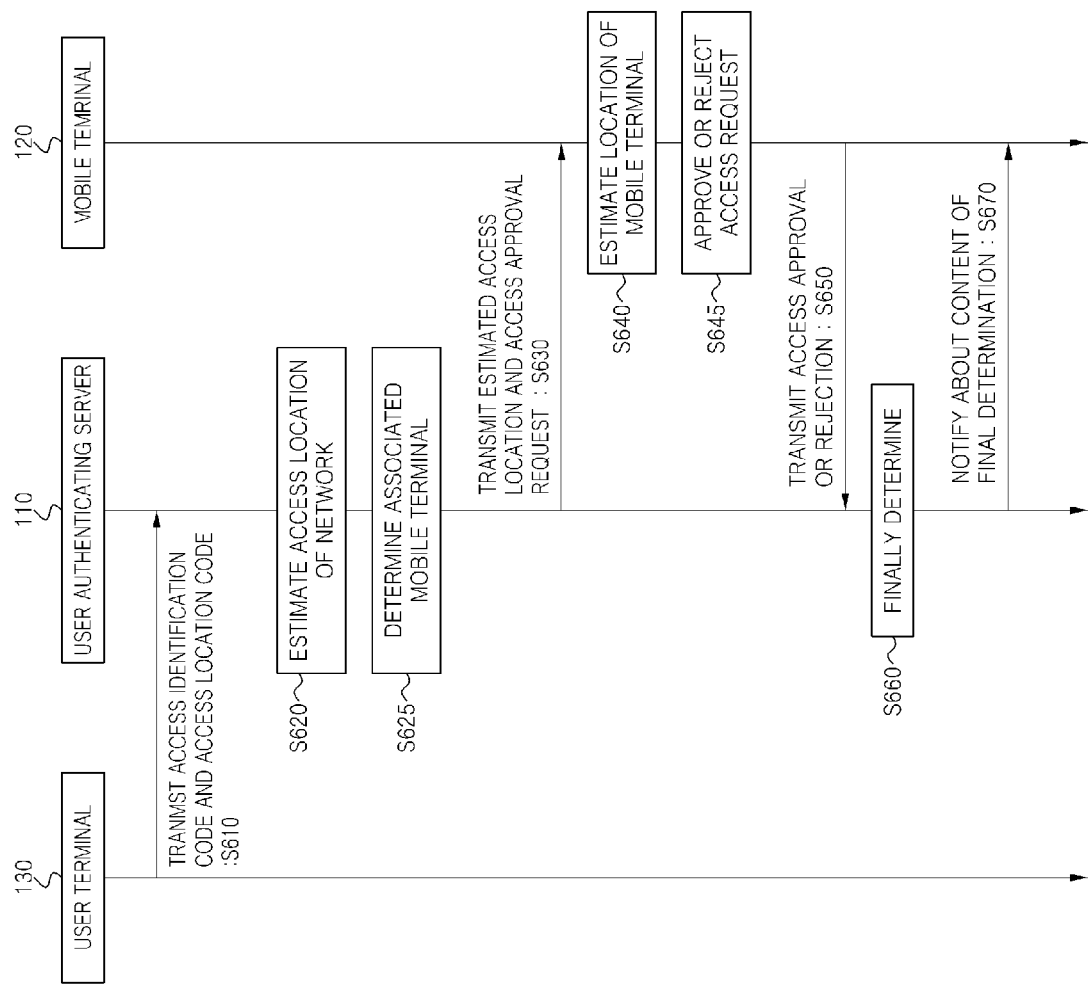
FIG. 6 is a flow chart illustrating a user authenticating process performed by the user authenticating system.

FIG. 6 is a flow chart illustrating a user authenticating process performed by the user authenticating system.

The user terminal 130 transmits an access identification code and an access location code to the access information receiving unit 210 (step S610). The access location estimating unit 220 estimates an access location of a network based on the received access location code (step S620). In an embodiment, the access location estimating unit 220 may convert the access location of a network into location information already used by the mobile terminal 120. Here, the location information may include location data converted by a GPS, a WPS, or a CPS.

The access information transmitting unit 230 determines at least one mobile terminal 120 associated with the received access identification code (step S625). The access information transmitting unit 230 transmits the access location of a network and am access approval request to the access approval request receiving unit 310 (S630).

The location estimating unit 320 estimates a location of the mobile terminal 120 (step S640). In step S640, the location estimating unit 320 may determine a location of the mobile terminal 120 based on a GPS, a WPS, or a CPS, and convert the location of the mobile terminal 120 into location data (e.g., a latitude or a longitude).

The access approving unit 330 may approve or reject the access approval request based on the access location of a network and the estimated location of the mobile terminal 120 (step S645). The access approval transmitting unit 340 transmits the approval or rejection determined by the access approving unit 330 to the access permission receiving unit 240 (step S650).

The access permission receiving unit 240 may finally determine an access approval or rejection (step S660). In an embodiment, when an access approval is received from the particular mobile terminal 120a, the access permission receiving unit 240 may disregard an access approval or rejection by the other remaining mobile terminals 120b and 120c. When the location-based access approval or rejection is finally determined, the access notifying unit 250 may notify at least one mobile terminal 120 about content of the final determination (step S670).

While the present invention has been shown and described in connection with the embodiments, it will be apparent to those skilled in the art that modifications and variations can be made without departing from the spirit and scope of the invention. Thus, the present invention is not limited to the foregoing embodiments and may include all the embodiments within the scope of the appended claims.

What is claimed is:

1. A user authenticating method performed by a user authenticating server connectable to at least one mobile terminal and a user terminal, the user authenticating method comprising:
receiving access information of a network including an access identification code, an access location code from the user terminal, wherein the access identification code corresponds to an ID, password, and certificate information, and wherein the access location code corresponds to a network address;
estimating an access location of a network based on the access location code;
determining at least one mobile terminal associated with the access identification code;
transmitting the estimated access location of a network to the at least one mobile terminal;
determining a scale of a map, to be displayed on a graphical user interface of the at least one mobile terminal, based on the estimated access location of the network and a location of the at least one mobile terminal;
displaying the map on the graphical user interface according to the determined scale;
presenting, on the map displayed on the graphical user interface, the estimated access location of the network and a location of the at least one mobile terminal;
overlaying a transparent pop-up window on the map, the pop-up window comprising a mechanism for receipt of an access approval or an access rejection; and
receiving a location-based access approval or access rejection determined based on the access location of a network, estimated based on the access location code, and a location of a particular mobile terminal belonging to the at least one mobile terminal from the particular mobile terminal.

2. The user authenticating method of claim 1, wherein the receiving of the location-based access approval or access rejection comprises:
when the estimated access location of a network and the location of the particular mobile terminal fall within a particular error range, receiving the location-based access approval automatically determined by the mobile terminal or determined by a user approval; and
when the estimated access location of a network and the location of the particular mobile terminal do not fall within the particular error range, receiving the location-based access rejection automatically determined by the mobile terminal.

3. The user authenticating method of claim 2, wherein the receiving of the location-based access approval or access rejection further comprises:
when the location-based access rejection is automatically received by the mobile terminal because the estimated access location and the location of the particular mobile terminal do not fall within the particular error range, requesting an access approval from a user associated with the network service.

4. The user authenticating method of claim 3, wherein the receiving of the location-based access approval or access rejection comprises:
when the location-based access approval is received from the particular mobile terminal, disregarding location-based access approvals or access rejections from the other remaining mobile terminals.

5. The user authenticating method of claim 4, further comprising:
when the location-based access approval or access rejection is finally determined, notifying at least some of the at least one mobile terminal about the determination.

6. The user authenticating method of claim 1, wherein the user authenticating server corresponds to at least one of: an Internet portal server, an Internet shopping mall server, an Internet service server, a cloud computing server, a main service server, or a banking service server.

7. The user authenticating method of claim 1, wherein the access location code corresponds to a network address.

8. The user authenticating method of claim 7, wherein the estimating of the access location of a network further comprises:
converting the network address into location information already used by the at least one mobile terminal.

9. The user authenticating method of claim 8, wherein the already used location information includes location data converted by a global positioning system (GPS), a WiFi-based positioning system (WPS), or a cellular-based positioning system (CPS).

10. A user authenticating method performed by a mobile terminal connectable to a user authenticating server, the user authenticating method comprising:
receiving, using an access information receiving unit of the mobile terminal, an access location of a network, including an access identification code, an access location code, and an access approval request from the user authenticating server, wherein the mobile terminal is a computing device, wherein the access identification code corresponds to an ID, password, and certificate information, and wherein the access location code corresponds to a network address;
estimating, using a location estimating unit of the mobile terminal, a location of the mobile terminal;
determining a scale of a map, to be displayed on a graphical user interface of the mobile terminal, based on the access location of the network and the estimated location of the mobile terminal;
displaying the map on the graphical user interface according to the determined scale;
presenting, on the map displayed on the graphical user interface, the estimated access location of the network and a location of the mobile terminal, wherein the presenting is performed using an access approving unit of the mobile terminal computing device;
overlaying a transparent pop-up window on the map, the pop-up window comprising a mechanism for receipt of an access approval or an access rejection; and
approving or rejecting, using the access approving unit of the mobile terminal computing device, the access approval request based on location information regarding the access location of a network, estimated based on the access location code, and the estimated location of the mobile terminal.

11. The user authenticating method of claim 10, wherein the user authenticating server corresponds to at least one of: an Internet portal server, an Internet shopping mall server, an Internet service server, a cloud computing server, a main service server, or a banking service server.

12. The user authenticating method of claim 10, wherein the approving or rejecting the access approval request comprises:
automatically approving the access approval request when the access location of a network and the estimated location of the mobile terminal fall within a particular error range.

13. The user authenticating method of claim 10, wherein the approving or rejecting the access approval request further comprises:
displaying the access location of a network and the estimated location of the mobile terminal on a map.

14. The user authenticating method of claim 13, wherein the approving or rejecting the access approval request further comprises:
prompting an access approval request from a user on the displayed map.

15. The user authenticating method of claim 10, wherein the approving or rejecting the access approval request further comprises:
prompting the access approval, determined based on a distance between the access location of a network and the estimated location of the mobile terminal, from the user.

16. The user authenticating method of claim 10, wherein the estimating of the location of the mobile terminal includes at least one of global positioning system (GPS)-based location information, WiFi-based positioning system (WPS)-based location information, and cellular-based positioning system (CPS)-based location information.

17. A system including a user authenticating server connectable to at least one mobile terminal and a user terminal, the system comprising:
one or more memory media comprising program code instructions; and
one or more processors, which when executing the program code instructions, cause the system to:
receive access information including an access identification code and an access location code from the user terminal, wherein the access identification code corresponds to an ID, password, and certificate information, and wherein the access location code corresponds to a network address;
estimate an access location of a network based on the access location code;
determine at least one mobile terminal associated with the access identification code, and transmit the estimated access location of a network to the at least one mobile terminal;
determine a scale of a map, to be displayed on a graphical user interface of the at least one mobile terminal, based on the estimated access location of the network and a location of the at least one mobile terminal;
display the map on the graphical user interface according to the determined scale;
present, on the map displayed on the graphical user interface, the estimated access location of the network and the location of the at least one mobile terminal;
overlay a transparent pop-up window on the map, the pop-up window comprising a mechanism for receipt of an access approval or an access rejection; and
receive a location-based access approval or access rejection determined based on the estimated access location of a network, estimated based on the access location code, and a location of a particular mobile terminal belonging to the at least one mobile terminal from the particular mobile terminal.

18. The system of claim 17, wherein, when the estimated access location of a network and the location of the particular mobile terminal fall within a particular error range, an access permission receiving unit receives the location-based access approval automatically determined by the mobile terminal or determined under a user approval, and when the estimated access location of a network and the location of the particular mobile terminal do not fall within the particular error range, the access permission receiving unit receives the location-based access rejection automatically determined by the mobile terminal.

19. The system of claim 18, wherein, when the location-based access rejection is automatically received by the mobile terminal because the estimated access location of a network and the location of the particular mobile terminal do not fall within the particular error range, the access permission receiving unit requests an access approval from a user associated with the network service.

20. The system of claim 19, wherein, when the location-based access approval is received from the particular mobile terminal, the access permission receiving unit disregards location-based access approvals or access rejections by the other remaining mobile terminals.

21. The system of claim 20, the program code instructions further causing the system to:
notify at least some of the at least one mobile terminal about content of determination, when the location-based access approval or access rejection is finally determined.

22. The system of claim 17, wherein the user authenticating server corresponds to an Internet portal server, an Internet shopping mall server, an Internet service server, a cloud computing server, a main service server, or a banking service server.

23. The system of claim 17, wherein the access location code corresponds to a network address.

24. The system of claim 23, wherein an access location estimating unit converts the network address into location information already used by the at least one mobile terminal.

25. The system of claim 24, wherein the already used location information includes location data converted by a global positioning system (GPS), a WiFi-based positioning system (WPS), or a cellular-based positioning system (CPS).

26. A system including a mobile terminal connectable to a user authenticating server and performing network service accessing, the mobile terminal comprising:
a memory medium comprising program code instructions; and
a processor, which when executing the program code instructions, causes the system to:
receive an access location of a network, including an access identification code, an access location code, and an access approval request from the user authenticating server, wherein the access identification code corresponds to an ID, password, and certificate information, and wherein the access location code corresponds to a network address;
estimate a location of the mobile terminal;
determine a scale of a map, to be displayed on a graphical user interface of the mobile terminal, based on the access location of the network and the estimated location of the mobile terminal;
displaying the map on the graphical user interface according to the determined scale;
present, on the map displayed on the graphical user interface, the estimated access location of the network and a location of the mobile terminal;
overlay a transparent pop-up window on the map, the pop-up window comprising a mechanism for receipt of an access approval or an access rejection; and
approve or reject the access approval request based on location information regarding the access location of a network, estimated based on the access location code, and the estimated location of the mobile terminal.

27. The system of claim 26, wherein the user authenticating server corresponds to an Internet portal server, an Internet shopping mall server, an Internet service server, a cloud computing server, a main service server, or a banking service server.

28. The system of claim 26, wherein when the access location of a network and the estimated location of the mobile terminal fall within a particular error range, the access approving unit automatically approves the access approval request.

29. The system of claim 26, wherein an access approving unit displays the access location of a network and the estimated location of the mobile terminal on a map.

30. The system of claim 29, wherein the access approving unit prompts an access approval request from a user displayed on the map.

31. The system of claim 26, wherein the access approving unit prompts an access approval request, determined based on a distance between the access location of a network and the estimated location of the mobile terminal, from a user.

32. The system of claim 26, wherein a location estimating unit determines the location of the mobile terminal based on at least one of global positioning system (GPS)-based location information, WiFi-based positioning system (WPS)-based location information, and cellular-based positioning system (CPS)-based location information.

* * * * *